United States Patent
Dong et al.

(10) Patent No.: US 11,873,951 B1
(45) Date of Patent: Jan. 16, 2024

(54) FULL-SPECTRUM ILLUMINATION METHOD FOR PLANT AND DEVICE THEREOF

(71) Applicant: FULTON SCIENCE AND TECHNOLOGY LIGHTING CO., LTD, Shenzhen (CN)

(72) Inventors: Pei Dong, Shenzhen (CN); Zhiqiang Xue, Shenzhen (CN)

(73) Assignee: FULTON SCIENCE AND TECHNOLOGY LIGHTING CO., LTD, Shenzhen (CN)

( * ) Notice: Subject to any disclaimer, the term of this patent is extended or adjusted under 35 U.S.C. 154(b) by 0 days.

(21) Appl. No.: 18/125,736

(22) Filed: Mar. 24, 2023

(30) Foreign Application Priority Data

Sep. 23, 2022 (CN) .......................... 202211170819.3

(51) Int. Cl.
*F21K 9/238* (2016.01)
*F21V 23/00* (2015.01)
*A01G 7/04* (2006.01)

(52) U.S. Cl.
CPC .............. *F21K 9/238* (2016.08); *A01G 7/045* (2013.01); *F21V 23/003* (2013.01)

(58) Field of Classification Search
CPC ........ F21K 9/238; A01G 7/045; F21V 23/003
See application file for complete search history.

(56) References Cited

U.S. PATENT DOCUMENTS

| | | | | |
|---|---|---|---|---|
| 6,967,448 B2* | 11/2005 | Morgan | ............... | G09G 3/2014 315/318 |
| 2005/0152143 A1* | 7/2005 | Lee | ........................ | A01G 7/045 362/230 |
| 2007/0139920 A1* | 6/2007 | Van De Ven | .......... | H05B 45/20 362/231 |
| 2010/0020536 A1* | 1/2010 | Bafetti | .................. | F21V 29/502 362/231 |
| 2010/0287830 A1* | 11/2010 | Chen | ...................... | A01G 7/045 362/1 |
| 2010/0289411 A1* | 11/2010 | Smits | ..................... | H05B 45/22 315/297 |
| 2011/0252705 A1* | 10/2011 | Van Gemert | .......... | A01G 9/249 47/66.7 |
| 2012/0043907 A1* | 2/2012 | Lu | ......................... | A01G 9/249 362/231 |
| 2018/0035616 A1* | 2/2018 | Wagner | ................. | C03C 17/009 |

* cited by examiner

*Primary Examiner* — Bryon T Gyllstrom

(57) ABSTRACT

A full-spectrum illumination method for plant and a full-spectrum illumination control device for plant are provided. The full-spectrum illumination method for plant includes following steps: illuminating plants through a combination of spectrum during a full life cycle of the plants. The combination of spectrum is a special spectrum combination formed through a plurality of LEDs. Improvement of photosynthesis effect in current plant illumination technology effectively improves effective components and unit time output of the plant, which is suitable for large-scale production and processing extraction of current plant factories.

8 Claims, 1 Drawing Sheet

FULL-SPECTRUM ILLUMINATION METHOD FOR PLANT AND DEVICE THEREOF

The present disclosure relates to a technical field of full-spectrum illumination, and in particular to a full-spectrum illumination method for plant and a device thereof.

BACKGROUND

Plant growth requires sunlight for photosynthesis. Plant growth lamps simulate principle of sunlight for supplementing or completely replacing sunlight for plants. Currently, with the development of photobiological regulation technology, illumination means for the plant growth are no longer single. Different plants, or the same plant at different growth periods, take different measures for regulation and are irradiated by different spectrum. For example, in a later period of the plant growth, infrared or ultraviolet light for short-time induction of the plants capable of being harvested for flowers or fruits is usually required according to photobiological research, so that requirements for multi-spectrum is proposed for plant growth illumination devices.

Stable illumination of artificial light source may prevent the plants from being influenced by climate and planting field and causing great fluctuation on quality of harvested effective ingredients during a growth cycle of the plants, stability and consistency cannot be ensured, and requirements of current industrial development cannot be satisfied. Therefore, with the industrialization development of plants, how to obtain harvested effective ingredients and mass production in planting technology for the plants becomes an urgent demand.

At present, targeted spectrum is designed for different plants, and the quality of the harvested effective ingredients of the plants of which is even higher than that under sunlight.

SUMMARY

The present disclosure aims to provide a full-spectrum illumination method for plant and a device thereof, which are configured to solve a technical problem that effective ingredients in natural planting of current planting technology cannot satisfy requirements of mass industrial production and processing.

In order to achieve the above aims, the present disclosure provides a full-spectrum illumination method for plant, including following steps:

illuminating plants through a combination of spectrum during a full life cycle of the plants.

Functional bands of the combination of the spectrum include a first spectrum, a second spectrum, a third spectrum, a fourth spectrum, and a fifth spectrum.

A wave band range of the first spectrum is 360~410 nm.
A wave band range of the second spectrum is 410~485 nm.
A wave band range of the spectrum is 485~625 nm.
A wave band range of the fourth spectrum is 625~700 nm.
A wave band range of the fifth spectrum is 700~780 nm.

Furthermore, a peak wavelength of each spectrum in the combination of the spectrum is respectively as following.

A peak wavelength of the first spectrum is between 385 nm+/−5 nm.
A peak wavelength of the second spectrum is between 450 nm+/−5 nm.
A peak wavelength of the third spectrum is between 585 nm+/−10 nm.
A peak wavelength of the fourth spectrum is between 660 nm+/−5 nm.
A peak wavelength of the fifth spectrum is between 730 nm+/−5 nm.

Furthermore, quantitative proportions of photons of the functional bands of the combination of the spectrum are as following.

A proportion of a photon quantitative value of the second spectrum to a photon quantitative value of the first spectrum is 3.1, and a tolerance range is +/−0.2.
A proportion of a photon quantitative value of the fourth spectrum to the photon quantitative value of the first spectrum is 5.4, and a tolerance range is +/−0.2.
A proportion of a photon quantitative value of the fifth spectrum to the photon quantitative value of the first spectrum is 1.0, and a tolerance range is +/−0.2.

Furthermore, a ratio of a peak value of the first spectrum, a peak value of the second spectrum, a peak value of the fourth spectrum, and a peak value of the fifth spectrum are 9:20:20:3.

Furthermore, the first spectrum is constructed by an LED light source with an individual 385 nm ultraviolet A (UVA).

The second spectrum and the third spectrum are constructed by a white light LED having a specific color temperature, and the white light is generated by exciting fluorescent powder with 450 nm blue light.

The fourth spectrum is constructed by an LED light source with an individual 660 nm red light.

The fifth spectrum is constructed by an LED light source with an individual 730 nm red light.

Furthermore, the full-spectrum illumination control device for plant includes at least four LEDs of a UVA LED, a 660 nm red light LED, a 730 nm red light LED, and at least one white light LED.

The power supply is respectively connected to the UVA LED, the 660 nm red light LED, the 730 nm red light LED, and the white light LED.

The UVA LED, the 660 nm red light LED, and the 730 nm red light LED respectively realize the first spectrum, the fourth spectrum, and the fifth spectrum.

The white light LED realizes the second spectrum and the third spectrum.

In order to achieve the above aims, the present disclosure further provides a full-spectrum illumination control device for plant, including a memory and a processor. The memory stores a control logic signal program, and when the control logic signal program is executed by the processor, the processor executes the full-spectrum illumination method for plant.

Furthermore, the full-spectrum illumination control device for plant includes at least four LEDs of a UVA LED, a 660 nm red light LED, a 730 nm red light LED, and at least one white light LED.

A power supply is respectively connected to the UVA LED, the 660 nm red light LED, the 730 nm red light LED, and the white light LED.

The UVA LED, the 660 nm red light LED, and the 730 nm red light LED respectively realize the first spectrum, the fourth spectrum, and the fifth spectrum.

The white light LED realizes the second spectrum and the third spectrum.

Furthermore, the full-spectrum illumination control device for plant further includes a charging interface and a power supply.

The charging interface is connected to the power supply. The power supply is respectively connected to the UVA LED, the 660 nm red light LED, the 730 nm red light LED, and the white light LED.

Furthermore, the full-spectrum illumination control device for plant further includes a main body, an optical device, and a hoisting assembly. A mounting cavity is defined in an upper opening of the main body. The UVA LED, the 660 nm red light LED, the 730 nm red light LED, and the at least one white light LED are disposed in the mounting cavity. The optical device is disposed on the main body. The optical device is configured to seal the UVA LED and the white light LED in the mounting cavity. The hoisting assembly is disposed on the main body, and the hoisting assembly is distal from the optical device for hoisting the main body.

In order to achieve the above aims, the present disclosure further provides a storage medium, and when the control logic signal program is executed by the processor, the processor executes the illumination method of the plant growth full life cycle as described above.

The present disclosure illuminates the plants through the combination of the spectrum during the full life cycle of plants, and controls the functional bands of the combination of the spectrum to be in following band ranges. The first spectrum is controlled to be in the band range of 360410 nm. The second spectrum is controlled to be in the band range of 410485 nm. The third spectrum is controlled to be in the band range of 485625 nm. The fourth spectrum is controlled to be in the band range of 625700 nm. The fifth spectrum is controlled to be in the band range of 700780 nm. The present disclosure provides the functional bands of the combination of the spectrum during a growth period of the plants, which greatly improves flower quantity and quality of the effective ingredients of the plants, is easy to operate, and realizes large-scale production.

BRIEF DESCRIPTION OF DRAWINGS

The present disclosure is further described below with reference to accompanying drawings and embodiments.

DETAILED DESCRIPTION

Figure 1:
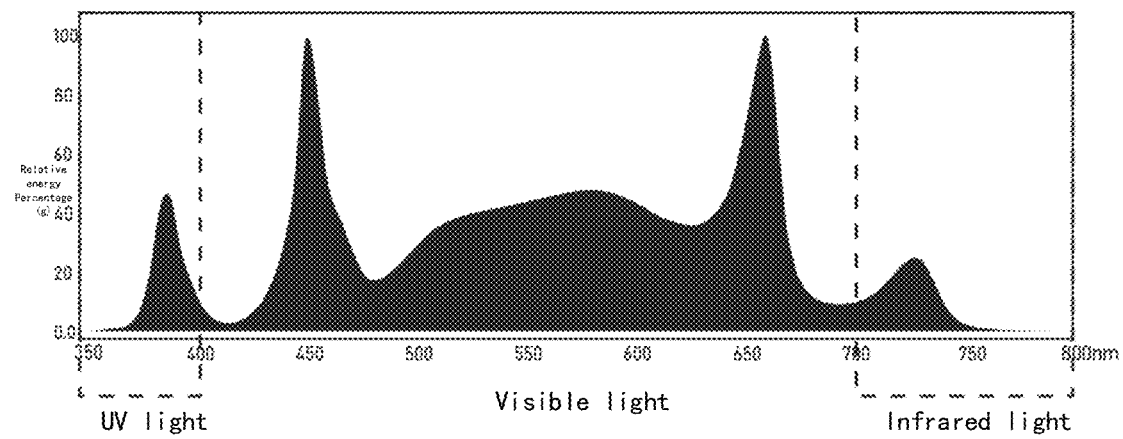
FIG. 1 is a schematic diagram of an effect of a combination of spectrum of a full-spectrum illumination method for plant according to one embodiment of the present disclosure.

Specific embodiments of the present disclosure are described in details below. The preferred embodiments of the present disclosure are shown in drawings. A function of the drawings is to supplement description of text parts with graphics, so that a person intuitively and vividly understands each technical feature and a whole technical solution of the present disclosure, but it cannot be understood as a limitation to a protection scope of the present disclosure.

The present disclosure provides a full-spectrum illumination method for plant, which is configured to solve a technical problem in prior art that quality of naturally-planted plants cannot satisfy requirements of mass industrial production and processing.

In an exemplary technology, plant growth illumination devices simulate a principle that the plants need sunlight for photosynthesis to supplement light for plant or completely replace the sunlight. At present, with the development of photobiological regulation technology, illumination means for the plant growth are no longer single. Different plants, or the same plant at different growth periods, take different measures for regulation and are irradiated by different spectrum.

For example, in an early period of the plant growth, growth of roots, stems, and leaves of the plants requires a plurality of blue light spectrum according to photobiological research; in a later period of the plants, infrared or ultraviolet light for short-time induction of the plants capable of being harvested for flowers or fruits is usually required according to the photobiological research, so that requirements for multi-spectrum is proposed for plant growth illumination devices.

Light quality refers to composition of wavelength which affects the photosynthesis and photomorphogenesis of the plants in light. About 4% ultraviolet light, 52% infrared radiation, and 44% visible light (Moore et al., 2003) are in the sunlight. Solar spectrum is full-spectrum.

The plants mainly experience different wavelengths of the light through light receptors. At present, the light receptors as shown of the plants are divided into four categories: a photosensitive pigment, a cryptochrome, a phototropin 1 (NPH 1), and one or several Ultraviolet B (UV-B) receptors not yet been identified. The photosensitive pigment senses red light and far-red light. The cryptochrome senses Ultraviolet A (UV-A) and blue light. The light receptors sense different light, and then growth and development of the plants are regulated through difference adjustment and interaction between the light receptors. The growth and development of the plants mainly include seed germination, root growth, stem growth, leaf growth, flowering, etc. The blue light is one of main wave bands of the photosynthesis of the plants, and meanwhile, the blue light has an important adjustment effect on the growth and development of the plants. Although the far-red light cannot directly act on the photosynthesis, the far-red light is configured as an environment signal to adjust the growth and development and metabolism of the plants. The far-red light mainly shows a shading effect and a flowering induction effect on the plants, which are two major effects on the plants.

At present, many research scholars carry out research on the growth and development of the plants. Light regulation aiming at the growth and development of the plants is mainly realized by adjusting a proportion of the red light and the blue light (R/B), and a proportion of the red light and the far-red light (R/FR).

Based on the above example technology, the present disclosure provides an embodiment of the full-spectrum illumination method for plant during a flowering period for the plants. The full-spectrum illumination method for plant, includes following steps:

illuminating plants through a combination of spectrum during a full life cycle of the plants.

Functional bands of the combination of the spectrum include a first spectrum, a second spectrum, a third spectrum, a fourth spectrum, and a fifth spectrum.

A wave band range of the first spectrum is 360–410 nm.
A wave band range of the second spectrum is 410–485 nm.
A wave band range of the spectrum is 485–625 nm.
A wave band range of the fourth spectrum is 625–700 nm.
A wave band range of the fifth spectrum is 700–780 nm.

The present disclosure provides the functional bands of the combination of the spectrum during a growth period of the plants, which greatly improves flower quantity and quality of the effective ingredients of the plants, is easy to operate, and realizes large-scale production. A schematic diagram of an effect of the combination of the spectrum is shown in FIG. 1. The present disclosure provides the functional bands of the combination of the spectrum during the growth period of the plants, which greatly improves the flower quantity and quality of the plants. The present disclosure further controls the functional bands of the combination of the spectrum for easy operation and large-scale production. In actual application, such industrial planting solves the technical problem in the prior art that the quality of the naturally-planted plants cannot satisfy requirements of mass industrial production and processing.

Furthermore, a peak wavelength of each spectrum in the combination of spectrum is respectively as following.

A peak wavelength of the first spectrum is between 385 nm+/−5 nm.

A peak wavelength of the second spectrum is between 450 nm+/−5 nm.

A peak wavelength of the third spectrum is between 585 nm+/−10 nm.

A peak wavelength of the fourth spectrum is between 660 nm+/−5 nm.

A peak wavelength of the fifth spectrum is between 730 nm+/−5 nm.

The schematic diagram of the effect of the combination of the spectrum is shown in FIG. 1. The present disclosure provides the functional bands of the combination of the spectrum during the growth period of the plants, which greatly improves the flower quantity and quality of the plants. The present disclosure further controls the functional bands of the combination of the spectrum for easy operation and large-scale production. In actual application, such industrial planting solves the technical problem in the prior art that the quality of the naturally-planted plants cannot satisfy requirements of mass industrial production and processing.

In addition, other planting conditions matched with illumination are determined through laboratory experiments, such as required water supply, soil, fertilizer feeding, and other factors, which ensures that the combination of the at the moment completely maximizes the growth period of the plants, so as to achieve a purpose of optimally improving the quality of the planted plants.

Beneficial effects of the present disclosure are described by taking the flowering plants as hemp:

Data is measured based on laboratory.

Control Example

1. Experimental Materials:

Plant Material: Robust Medicinal Hemp Cuttage Strain.

Growth to plant type under a consistent condition: in an initial state, controlling 4 primary branches and 8-10 secondary branches with plant heights having difference less than 2 cm and stem diameters having difference less than 0.5 mm. After obvious inflorescence differentiation, the plant type is no longer trimmed.

Culture medium is coconut bran and vermiculite having a ratio of 1:1.

Environmental control: temperature: 20+/−2° C., relative humidity: 5070%.

Illumination contrast: 1. sodium lamp; 2. fluorescent lamp; and 3. LED lamp. It should be noted that LED lamps are matched with the spectrum combination required to be protected in the present disclosure for illumination.

Florescence: florescence spectrum, 600~800 umol/m2, irradiating for 12 hours.

Nutrient solution: nutrient solution at flowering period: EC=2.5 ms/cm; pH=5.56.0

2. Test Method:

2.1. During the flowering period, using the traditional plant growth sodium lamp, the fluorescent lamp, and the LED plant lamp with the above spectral combination for illumination, and obvious flower bud differentiation occurs about 1-2 weeks later.

2.2 Pollen Collection Standard:

2.2.1. In main branch inflorescences, most of male flowers are dehiscent, and 1-2 of the male flowers are fully open, so the male flowers are harvested.

2.2.2. Sampling: 10 cm inflorescence from a top, and 3 per plant. Manually separating the male flowers, placing the male flowers in sulfuric acid paper bags, sealing the sulfuric acid paper bags, and drying the male flowers in an oven at 25+/−1° C.

2.2.3. Sieving the dried male flowers through 50 meshes to obtain pollen.

2.2.4. Note: After harvesting a male flower or separating a kind of pollen, replacing gloves, passing through a wind shower and sterilizing with alcohol.

Figure 2:
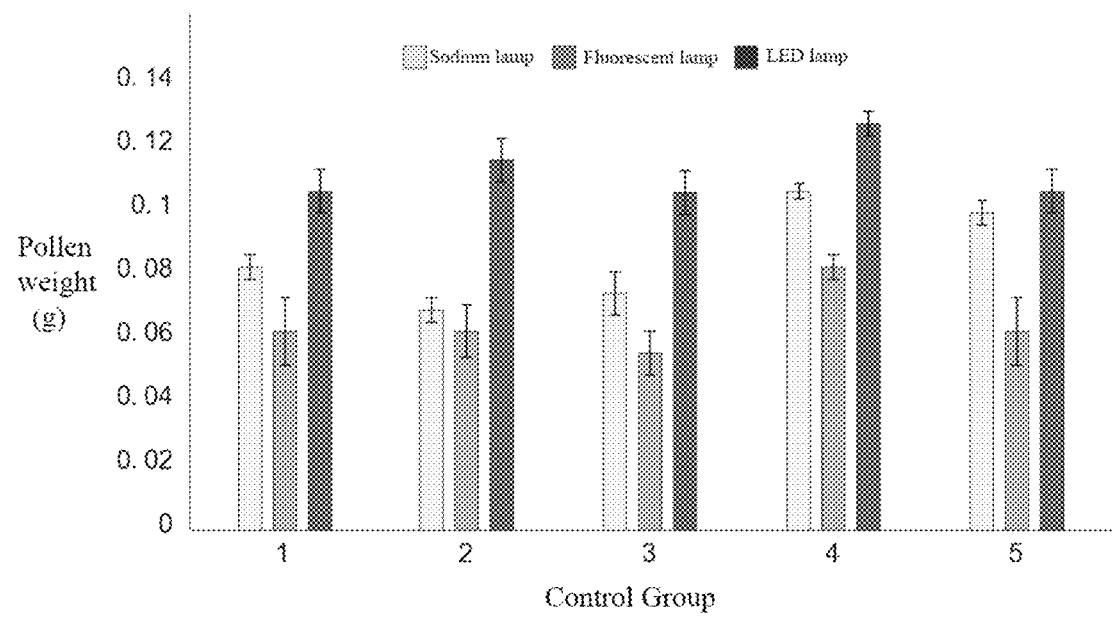
FIG. 2 is a schematic diagram of parameter comparison between detection results of an experimental group and a control group of the full-spectrum illumination method for the plant according to one embodiment of the present disclosure.

3. Comparative Analysis of Results:

Pollen weights after each irradiation treatment are shown in FIG. 2: the unit inflorescence in FIG. 2 refers to the continuous 10 cm inflorescence starting from the top, with a specific length of 10 cm.

As shown in FIG. 2, in the flowering period of the hemp, planting results in different illumination environments are inconsistent in the flowering period of the hemp. For illumination with the fluorescent lamp, there was relatively less pollen, and there was significant difference between other groups. For illumination of the sodium lamp, there is relatively more pollen, and there is a significant difference among the groups. For illumination with the above-described spectral combination LED, the amount of pollen produced is relatively maximum, and there is basically no significant difference between groups. From the quality of pollen obtained, LED illumination with the combination of the spectral has the best effect. From the quality of the obtained pollen, the LED illumination with the combination of the spectral has the best effect.

In the embodiment, quantitative proportions of photons of the functional bands of the combination of spectrum are as following. A proportion of a photon quantitative value of the second spectrum to a photon quantitative value of the first spectrum is 3.1, and a tolerance range is +/−0.2. A proportion of a photon quantitative value of the fourth spectrum to the photon quantitative value of the first spectrum is 5.4, and a tolerance range is +/−0.2. A proportion of the photon quantitative value of the fifth spectrum to the photon quantitative value of the first spectrum is 1.0, and a tolerance range is +/−0.2.

Since different photon values represent different selected spectra, the spectrum combination is further determined according to the photon values, which greatly improves the flower quantity and quality of the hemp plants, and is easy to operate and be produced in a large scale. It should be noted that the photon value of the third spectrum is not required and is taken arbitrarily without affecting the technical effect of the scheme.

In the embodiment, a ratio of a peak value of the first spectrum, a peak value of the second spectrum, a peak value of the fourth spectrum, and a peak value of the fifth spectrum are 9:20:20:3.

Among the embodiment, the peak value of the third spectrum is not required and is taken arbitrarily without affecting the technical effect of the scheme. It should be noted that the above proportion is further expressed as a percentage, which fluctuates within 5% of the band.

Furthermore, when the flowering plant is hemp, illumination time of a preset proportion of the combination of the spectrum is 12~16 hours.

Through guarantee of the above illumination time, it ensures that an impact of the combination of spectrum on the plants reaches a critical value within a certain time to achieve a best illumination effect, which further improves the growth of parts of the plants that are configured for industrialization.

In the embodiment, the first spectrum is constructed by an LED light source with an individual 385 nm Ultraviolet A (UVA).

A peak value of the second spectrum and a peak value of the third spectrum are constructed by a white light LED adopting a specific color temperature, and the white light is generated by exciting fluorescent powder with 450 nm blue light.

The fourth spectrum is constructed by an LED light source with an individual 660 nm red light.

The fifth spectrum is constructed by an LED light source with an individual 730 nm red light.

Through a spectrum combination scheme in the above LED light sources combination cost application, a certain continuous spectrum is finally formed to replace sunlight on plants. Compared with sunlight, the combination of the LED light sources has more spectrum beneficial to the photosynthesis, and spectrum unfavorable to plant growth is eliminated. Compared with traditional HID (High intensity Discharge, high pressure gas discharge lamp, mercury, sodium, gold, xenon lamp), spectral distribution of the present disclosure is more reasonable and effective, and central temperature of the lamp is greatly reduced, which is conducive to the growth and development of the plants, and helps to increase content of the effective ingredients in the flowers per unit time and per unit area in plant factory production.

The present disclosure further provides an illumination device for the flowering plants, including: a memory and a processor. The memory stores a computer program, and when the computer program is executed by the processor, the processor executes steps of the full-spectrum illumination method for plant as described above.

It should be noted that since the illumination device for the flowering plants in present disclosure includes all the steps of the full-spectrum illumination method for plant, the illumination device for the flowering plants further realizes all the schemes of the full-spectrum illumination method for plant, and has the same beneficial effects, so it is not repeated here.

Furthermore, an illumination device for the flowering plants includes at least four LEDs: a UVA LED, a 660 nm red light LED, a 730 nm red light LED, and at least one white light LED.

A power supply is respectively connected to the UVA LED, the 660 nm red light LED, the 730 nm red light LED, and the white light LED.

The UVA LED, the 660 nm red light LED, and the 730 nm red light LED respectively realize the first spectrum, the fourth spectrum, and the fifth spectrum.

The white light LED realizes the second spectrum and the third spectrum.

Through scheme of the combination of the spectrum in the above LED light sources combination cost application, a certain continuous spectrum is finally formed to replace sunlight on plants. Compared with sunlight, the illumination device for the flowering plants formed by the combination of the LED light sources has more spectrum beneficial to the photosynthesis, and spectrum unfavorable to plant growth is eliminated. Compared with traditional HID, spectral distribution of the present disclosure is more reasonable and effective, and central temperature of the lamp is greatly reduced, which is conducive to the growth and development of the plants, and helps to increase content of the effective ingredients in the flowers per unit time and per unit area in plant factory production.

At this time, the illumination device for the flowering plants is an LED plant growth lamp and other forms of expression.

Furthermore, the illumination device for the flowering plants further includes a charging interface and a power supply. The charging interface is connected to the power supply. The power supply is respectively connected to the UVA LED, the 660 nm red light LED, the 730 nm red light LED, and the white light LED.

The above scheme ensures illumination for a period of time after power failure, and avoids an impact of sudden power failure or line failure on the growth of the flowering plants.

Furthermore, the illumination device for the flowering plants further includes a main body, an optical device, and a hoisting assembly. A mounting cavity is defined in an upper opening of the main body. The UVA LED, the 660 nm red light LED, the 730 nm red light LED, and the at least one white light LED are disposed in the mounting cavity. The optical device is disposed on the main body. The optical device is configured to seal the UVA LED and the white light LED in the mounting cavity. The hoisting assembly is disposed on the main body. The hoisting assembly is distal from the optical device for hoisting the main body.

Among the embodiments, the optical device is designed according to an area to be illuminated by the actual illumination device, so as to make illumination uniform and ensure that the plants in the irradiation area achieve uniform illumination. In addition, the hoisting assembly is configured to hoist the main body. The hoisting assembly is a fastener set at both ends or both sides of the main body, and the main body is fixed by hooks, ropes, or pull ropes through the fastener, so that the illumination device for the flowering plants is installed as required.

The present disclosure further provides a storage medium, and when the computer program is executed by the processor, the processor executes the full-spectrum illumination method for plant as described above.

It should be noted that since the storage medium of the present disclosure includes all the steps of the full-spectrum illumination method of the above plants, the storage medium further realizes all the solutions of the full-spectrum illumination method for plant, which has the same beneficial effects, so it will not be repeated here.

In performing the full-spectrum illumination method for plants in the above method embodiments, the embodiments described above are only schematic, in which units described as separation components are or are not physically separated, that is, the units are disposed in one place or distributed to multiple network units. Some or all of the modules are selected according to actual needs to achieve the purpose of the present disclosure. Those skilled in the art understand that all or some of the steps and systems in the methods disclosed above are implemented as software, firmware, hardware, and appropriate combinations thereof.

Some or all of the physical components are implemented as software executed by the processor, such as a central processor, a digital signal processor, or a microprocessor, or as hardware, or as an integrated circuit, such as an application specific integrated circuit. Such software is distributed on a computer-readable medium, which includes a computer storage medium (or a non-temporary medium) and a communication medium (or a temporary medium). As is well known to those skilled in the art, the term "computer storage medium" includes volatile and nonvolatile, removable and non-removable media implemented in any method or technology for storing information, such as computer-readable instructions, data structures, program modules, or other data. The storage media of computer memory 15 includes but are not limited to RAM, ROM, EEPROM, flash memory, or other storage technologies, CD-ROM, digital multi-function disk (DVD), or other optical disk storage, magnetic box, tape, disk storage, or other magnetic storage devices, or any other media that is configured to store desired information and is accessed by the computer. In addition, it is well known to those skilled in the art that the communication medium usually includes computer-readable instructions, data structures, program modules, or other data in a modulated data signal such as a carrier, or other 20 system transmitter, and includes any information delivery medium.

Technical features of the above embodiments are combined arbitrarily. To make the description concise, all possible combinations of the technical features of the above embodiments are not described. However, as long as there is no contradiction in the combination of the technical features, it should be considered as a scope of the description of the present disclosure.

What is claimed is:

1. A full-spectrum illumination method for plant, comprising following steps:
   illuminating plants through a combination of spectrum during a full life cycle of the plants;
   functional bands of the combination of the spectrum comprise:
   a first spectrum, having a wave band range of 360~410 nm;
   a second spectrum, having a wave band range of 410~485 nm;
   a third spectrum, having a wave band range of 485~625 nm;
   a fourth spectrum, having a wave band range of 625~700 nm; and
   a fifth spectrum, having a wave band range of 700~780 nm;
   wherein quantitative proportions of photons of the functional bands of the combination of the spectrum are as following:
   a proportion of a photon quantitative value of the second spectrum to a photon quantitative value of the first spectrum is 3.1, and a tolerance range is +/−0.2;
   a proportion of a photon quantitative value of the fourth spectrum to the photon quantitative value of the first spectrum is 5.4, and a tolerance range is +/−0.2; and
   a proportion of a photon quantitative value of the fifth spectrum to the photon quantitative value of the first spectrum is 1.0, and a tolerance range is +/−0.2.

2. The full-spectrum illumination method for plant according to claim 1, wherein a peak wavelength of each spectrum in the combination of spectrum is respectively as following:
   a peak wavelength of the first spectrum is between 385 nm+/−5 nm;
   a peak wavelength of the second spectrum is between 450 nm+/−5 nm;
   a peak wavelength of the third spectrum is between 585 nm+/−10 nm;
   a peak wavelength of the fourth spectrum is between 660 nm+/−5 nm; and
   a peak wavelength of the fifth spectrum is between 730 nm+/−5 nm.

3. The full-spectrum illumination method for plant according to claim 2, wherein a ratio of a peak value of the first spectrum, a peak value of the second spectrum, a peak value of the fourth spectrum, and a peak value of the fifth spectrum is 9:20:20:3.

4. The full-spectrum illumination method for plant according to claim 1, wherein the first spectrum is constructed by an LED light source having an individual 385 nm ultraviolet A (UVA);
   the second spectrum and the third spectrum are constructed by a white light LED having a specific color temperature, wherein white light is generated by exciting fluorescent powder with 450 nm blue light;
   the fourth spectrum is constructed by an LED light source having an individual 660 nm red light; and
   the fifth spectrum is constructed by an LED light source having an individual 730 nm red light.

5. A full-spectrum illumination control device for plant, comprising:
   a memory; and
   a processor;
   wherein the memory stores a control logic signal program, when the control logic signal program is executed by the processor, the processor executes a full-spectrum illumination method for plant comprising following steps:
   illuminating plants through a combination of spectrum during a full life cycle of the plants;
   functional bands of the combination of the spectrum comprise:
   a first spectrum, having a wave band range of 360~410 nm;
   a second spectrum, having a wave band range of 410~485 nm;
   a third spectrum, having a wave band range of 485~625 nm;
   a fourth spectrum, having a wave band range of 625~700 nm; and
   a fifth spectrum, having a wave band range of 700~780 nm;
   wherein the full-spectrum illumination control device for plant further comprises a charging interface and a power supply,
   the charging interface is connected to the power supply, and the power supply is respectively connected to the UVA LED, the 660 nm red light LED, the 730 nm red light LED, and the white light LED.

6. The full-spectrum illumination control device for plant according to claim 5, wherein the full-spectrum illumination control device for plant comprises at least four LEDs of a UVA LED, a 660 nm red light LED, a 730 nm red light LED, and at least one white light LED;
   a power supply is respectively connected to the UVA LED, the 660 nm red light LED, the 730 nm red light LED, and the white light LED;
   the UVA LED, the 660 nm red light LED, and the 730 nm red light LED respectively realize the first spectrum, the fourth spectrum, and the fifth spectrum;

the white light LED realizes the second spectrum and the third spectrum; and the processor executes adjustment of output optical powers of the UVA LED, the 660 nm red light LED, the 730 nm red light LED, and the white light LED.

7. The full-spectrum illumination control device for plant according to claim 5, wherein the full-spectrum illumination control device for plant further comprises a main body, an optical device, and a hoisting assembly; a mounting cavity is defined in an upper opening of the main body, the UVA LED, the 660 nm red light LED, the 730 nm red light LED, and the at least one white light LED are disposed in the mounting cavity, the optical device is disposed on the main body, the optical device is configured to seal the UVA LED and the white light LED in the mounting cavity, the hoisting assembly is disposed on the main body, and the hoisting assembly is distal from the optical device for hoisting the main body.

8. A full-spectrum illumination method for plant, comprising following steps:

illuminating plants through a combination of spectrum during a full life cycle of the plants;

functional bands of the combination of the spectrum comprise:

a first spectrum, having a wave band range of 360~410 nm;

a second spectrum, having a wave band range of 410~485 nm;

a third spectrum, having a wave band range of 485~625 nm;

a fourth spectrum, having a wave band range of 625~700 nm; and a fifth spectrum, having a wave band range of 700~780 nm;

wherein a peak wavelength of each spectrum in the combination of spectrum is respectively as following:

a peak wavelength of the first spectrum is between 385 nm+/−5 nm;

a peak wavelength of the second spectrum is between 450 nm+/−5 nm;

a peak wavelength of the third spectrum is between 585 nm+/−10 nm;

a peak wavelength of the fourth spectrum is between 660 nm+/−5 nm; and a peak wavelength of the fifth spectrum is between 730 nm+/−5 nm;

wherein a ratio of a peak value of the first spectrum, a peak value of the second spectrum, a peak value of the fourth spectrum, and a peak value of the fifth spectrum is 9:20:20:3.

* * * * *